US006759618B2

(12) United States Patent
Becker et al.

(10) Patent No.: US 6,759,618 B2
(45) Date of Patent: Jul. 6, 2004

(54) METHOD FOR CONNECTING A CURRENT SUPPLY WIRE WITH A CONTACT PATCH OF AN ELECTRICAL LAMP

(75) Inventors: Wolf-Ruediger Becker, Honow (DE); Martin Fornalski, Berlin (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 471 days.

(21) Appl. No.: 09/937,503

(22) PCT Filed: Jan. 22, 2001

(86) PCT No.: PCT/DE01/00249

§ 371 (c)(1),
(2), (4) Date: Sep. 27, 2001

(87) PCT Pub. No.: WO01/56061

PCT Pub. Date: Aug. 2, 2001

(65) Prior Publication Data

US 2003/0070293 A1 Apr. 17, 2003

(30) Foreign Application Priority Data

Jan. 27, 2000 (DE) ........................................ 100 03 434

(51) Int. Cl.$^{7}$ ................................................. B23K 9/00
(52) U.S. Cl. ....................................... 219/56.22; 445/27
(58) Field of Search ........................... 219/56.22, 56.21, 219/130.4, 137 R; 445/23, 26, 27, 43

(56) References Cited

U.S. PATENT DOCUMENTS 2,749,528 A * 6/1956 Albrecht ..................... 439/617
3,493,718 A * 2/1970 Gorman ................... 219/130.4
4,458,136 A * 7/1984 Wagatsuma ............. 219/137 R

FOREIGN PATENT DOCUMENTS

| | | |
|---|---|---|
| DD | 68 293 | 8/1969 |
| DD | 137 992 | 10/1979 |
| DD | 211 299 | 7/1984 |
| DD | 237 934 | 7/1986 |
| DE | 198 52 396 | 6/1999 |
| FR | 2 776 464 | 9/1999 |
| JP | 2000-094140 | 9/2000 |

* cited by examiner

*Primary Examiner*—Clifford C Shaw
(74) *Attorney, Agent, or Firm*—William H. McNeill

(57) ABSTRACT

The invention relates to a method for connecting a contact plate (2) a lamp cap to the supply conductor wire (4) which is passed through an aperture (2*a*) in the contact plate (2). With the aid of a wire (5) which serves as filler, the supply conductor wire (4) and the contact plate (2) are soldered together, by generating an arc between the additional wire (5) and the supply conductor wire (4) or the contact plate (2). The solidified molten material of the additional wire (5) closes off the aperture (2*a*) and produces a reliable soldered join between the supply conductor wire (4) and the contact plate (2). The polarity of the electric voltage used to generate the arc is advantageously such that the additional wire (5) acts as an anode and the contact plate (2) or the supply conductor wire (4) acts as a cathode. The soldering process according to the invention advantageously takes place under an inert-gas atmosphere.

13 Claims, 2 Drawing Sheets

METHOD FOR CONNECTING A CURRENT SUPPLY WIRE WITH A CONTACT PATCH OF AN ELECTRICAL LAMP

The invention relates to a method for connecting a supply conductor wire to a contact plate in accordance with the preamble of patent claim 1.

I. Prior Art

A method of this type is disclosed, for example, in German Laid-Open Specification DE 198 52 396 A1. This laid-open specification describes a lamp-cap contact plate with a bore for a supply conductor wire, which is welded or soldered to the lamp-cap contact plate. The bore is surrounded by a torn collar which is used to produce the welded or soldered join to the supply conductor wire.

II. Summary of the Invention

The object of the invention is to provide, for electric lamps, a method for connecting the supply conductor wire to a contact plate which, without using lead-containing solder, ensures a secure join and good electrical contact between the contact plate and the supply conductor wire.

In a method of the generic type, this object is achieved by the characterizing features of patent claim 1. Particularly advantageous features of the invention are disclosed in the subclaims.

According to the inventive method, an additional wire is used to connect the supply conductor wire which has been guided through the aperture in the contact plate to the contact plate of the lamp, an arc being generated between the additional wire and the supply conductor wire or between the additional wire and the contact plate, in the region of the aperture, so that at least some of the material of the additional wire is melted and the aperture is closed off with the aid of the molten material. This ensures that the supply conductor wire is embedded in the resolidified molten material. The solidified molten material produces a secure join and electrical contact between the supply conductor wire and the contact plate. The soldering process according to the invention only requires a short time, does not need any preheating of the parts which are to be soldered and therefore also does not lead to overheating and destruction of the ceramic or glass insulator arranged in the lamp cap.

The arc for soldering the supply conductor wire to the contact plate is advantageously generated with the aid of an electric voltage, the polarity of which is such that the positive pole is connected to the additional wire and the negative pole is connected to the contact plate and/or the supply conductor wire. In this way, the additional wire, in the discharge which generates the arc, acts as an anode, and the contact plate and/or the supply conductor wire acts as a cathode. Therefore, the additional wire is heated to a greater extent in the arc than the contact plate or the supply conductor wire. Moreover, this polarity of the electric voltage removes any contaminants from the contact plate formed during the capping of the lamp from the arc. Advantageously, the negative pole of the voltage source is connected to the contact plate, and the contact plate is in electrical contact with the supply conductor wire during the arc soldering, since the contact plate, unlike the supply conductor wire, most of which runs inside the lamp cap, is readily accessible from the outside. In this case, the arc is nevertheless preferentially formed between the additional wire and the supply conductor wire.

The additional wire advantageously consists of a material whose melting temperature is lower than the melting temperature of the contact plate, in order to ensure that the material of the additional wire is preferentially melted.

However, even if the additional wire consists of the same material as the contact plate or the supply conductor wire, the above-described polarity of the electric voltage which generates the arc ensures that the additional wire is heated to a greater extent than the contact plate and the supply conductor wire, so that even in this case the material of the additional wire is preferentially melted during the arc soldering process. The soldering method according to the invention, i.e. the generation of the arc, is advantageously carried out under an inert-gas atmosphere, in order to avoid scaling of the contact plate and undesirable oxidation processes at the location of the solder.

The diameter of the aperture in the contact plate is advantageously smaller than the sum of the diameters of the supply conductor wire and the additional wire. This prevents the additional wire, during the generation of the arc, from inadvertently being introduced into the aperture, so that an undefined arc is formed, leading to an interruption to the soldering operation. The method according to the invention has proven particularly advantageous for supply conductor wires which consist of a material selected from the group consisting of copper, nickel, copper alloy or nickel alloy. The additional wire advantageously consists of copper or a copper alloy. The contact plate used is advantageously a metal plate which consists of a material selected from the group consisting of stainless steel, brass, copper or nickel. The method according to the invention is particularly suitable for the production of corrosion-resistant copper-nickel welded or soldered joins.

DESCRIPTION OF THE PREFERRED EXEMPLARY EMBODIMENT

Figure 1:
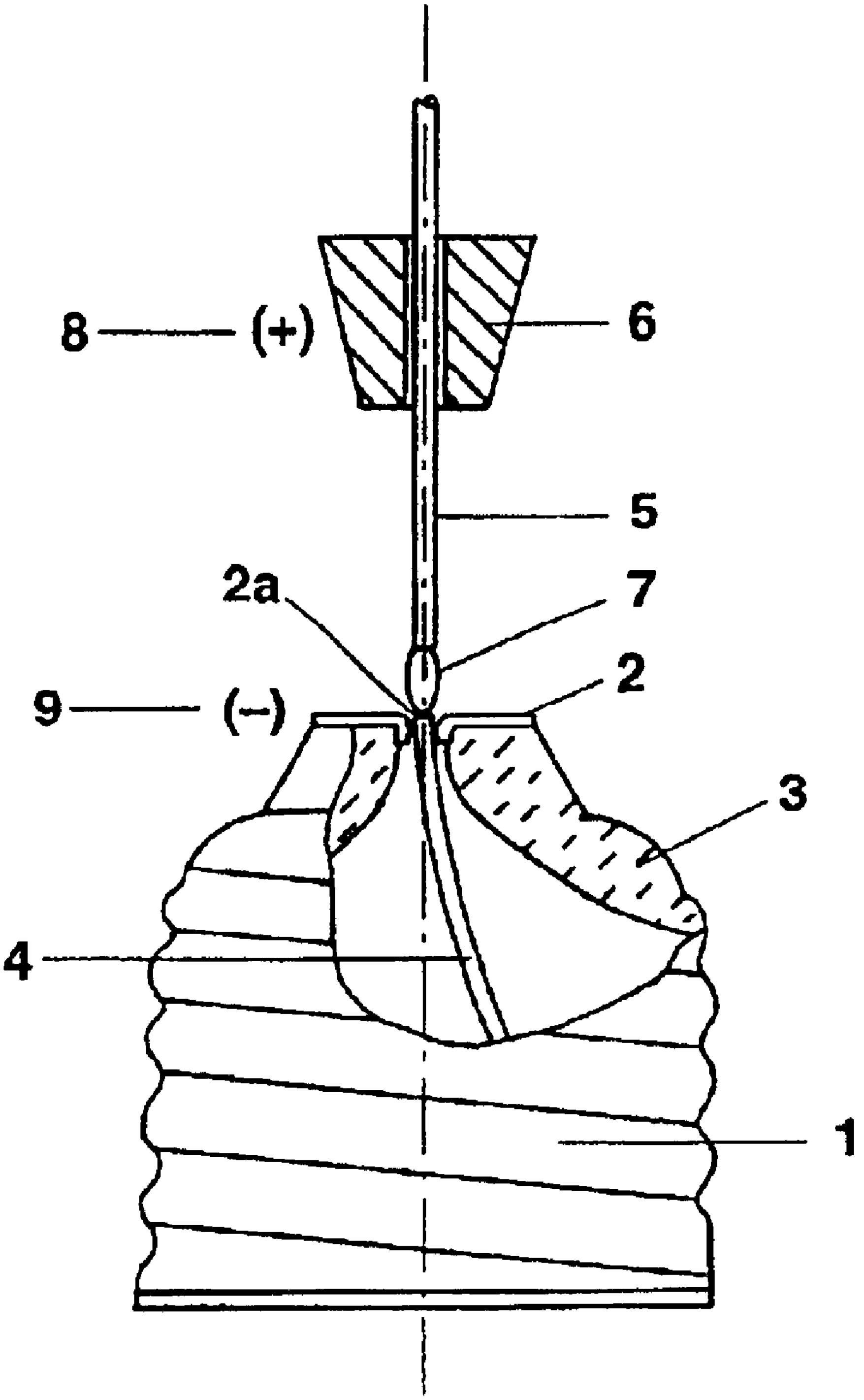
FIG. 1 shows a diagrammatic, partially sectional illustration of an embodiment of the invention.

The invention is explained in more detail below with reference to a preferred exemplary embodiment. FIG. 1 shows a diagrammatic, partially sectional illustration of a lamp cap with contact plate, supply conductor wire and an additional wire, which is used as solder to produce the soldered join between the contact plate and the supply conductor wire. The soldering device is not shown in the figure.

The method according to the invention is to be explained by way of example on the basis of a generally known Edison screw cap of an electric lamp and with the aid of the diagrammatic FIG. 1. The screw cap has a metallic cap sleeve 1 equipped with a screw thread, a contact plate 2, which forms the base contact of the screw cap, and an insulator body 3, which ensures electrical insulation between the cap sleeve 1 and the base contact plate 2. The lamp usually has two supply conductor wires 4, of which one (not shown) is connected to the cap sleeve 1 and the other 4 is connected in an electrically conductive manner to the base contact plate 2. The contact plate 2 is provided with an aperture 2*a*. Before the supply conductor wire 4 is soldered to the contact plate 2, an end of the supply conductor wire 4 which may project too far beyond the level of the contact plate 2 is cut off. To solder the supply conductor wire 4 to the contact plate 2, an additional wire 5, which consists of copper or a copper alloy, is used as filler. The additional wire 5 is positioned above the aperture 2*a* and above the end of the supply conductor wire 4 by means of a holding means 6 of a soldering device (not shown). Via its holding means 6, the additional wire 5 is connected to the positive pole 8 of a DV voltage source, while the contact plate 2 and the supply conductor wire 4 which is in electrical contact therewith is connected to the negative pole 9 of the DC source by the soldering device (not shown). To generate an arc between the supply conductor wire 4 and the additional wire 5, the distance between these two wires 4, 5 is initially reduced to such an extent that they come into contact with one another and an electric current flows across the contact. By means of the rising wire 5, the supply conductor wire 4 is brought into contact with the edge of the aperture 2*a*. When a distance is restored between the two wires 4, 5, an arc 7 is formed between the additional wire 5 and the supply conductor wire 4 or between the additional wire 5 and the contact plate 2. During this discharge, the additional wire 5 acts as anode and the supply conductor wire 4 or the contact plate 2 acts as cathode. The end of the additional wire 5 is heated to over its melting temperature in the arc. The molten material then completely closes the aperture 2*a* in the contact plate 2 and, after solidification, produces a permanent mechanical and electrical connection between the contact plate 2 and the supply conductor wire 4. The soldering process is carried out under an inert-gas atmosphere, for example under an argon atmosphere. For this purpose, the soldering location is arranged in a gas-flushing chamber (not shown), which is part of the soldering device (not shown) and ensures a constant inert-gas pressure in the gas flushing chamber, for example by means of vent openings, during the arc soldering. The soldering operation takes up at most 200 ms.

In this exemplary embodiment, the contact plate 2 consists of a stainless steel and is approximately 0.2 mm to 0.4 mm thick. The supply conductor wire 4 is a nickel wire with a diameter of between 0.5 mm and 1.0 mm. The additional wire 5 which is used as solder consists of copper or a copper alloy and has a diameter of between 0.8 mm and 1.0 mm.

However, the invention is not restricted to the exemplary embodiment which is described in more detail above. The method according to the invention can also be employed if the contact plate consists of a material selected from the group consisting of stainless steel, brass, copper or nickel and the supply conductor consists of a material selected from the group consisting of copper, nickel, copper alloy or nickel alloy.

Figure 2:
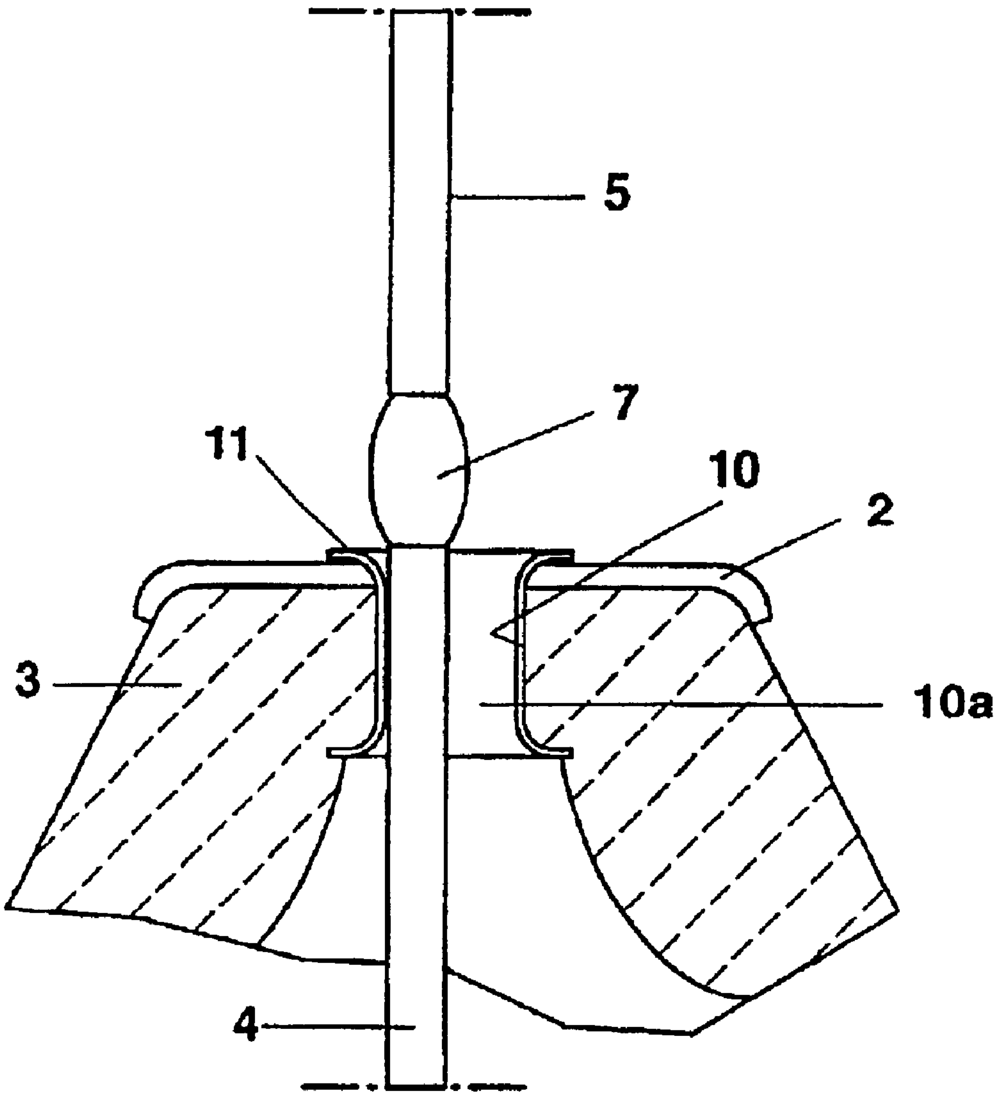
FIG. 2 shows a further exemplary embodiment of the invention.

Furthermore, FIG. 2 shows a further exemplary embodiment of the invention. For identical parts, the same reference numerals as in the first exemplary embodiment explained above were used. The only difference from the first exemplary embodiment consists in the fact that, in the second exemplary embodiment of the invention, a metallic tubular rivet 10, the external diameter of which is matched to the internal diameter of the aperture 2*a* in the contact plate 2 and of the aperture in the insulating body 3, is introduced into the aperture 2*a* of the contact plate 2 and into the aperture in the insulating body 3 for the supply conductor 4. That edge 11 of the tubular rivet 10 which projects above the contact plate 2 is flanged over. The supply conductor 4 which is to be connected to the contact plate 2 is threaded through the tubular rivet 10, and any end of the supply conductor 4 which projects out of the cap, above the edge 11 of the tubular rivet 10, is cut off. As has already been described in connection with the first exemplary embodiment, the additional wire 5 is positioned above the tubular rivet 10 and above the end of the supply conductor wire 4 by means of a holding means 6 of a soldering device (not shown). By means of its holding means 6, the additional wire 5 is connected to the positive pole 8 of a DC voltage source, while the contact plate 2 and the tubular rivet 10 which is in electrical contact therewith, as well as the supply conductor wire 4, are connected to the negative pole 9 of the DC source via the soldering device (not shown). To generate an arc between the supply conductor wire 4 and the additional wire 5, the distance between these two wires 4, 5 is initially reduced to such an extent that they come into contact with one another and an electric current flows across the contact. The supply conductor wire 4 is brought into contact with the tubular rivet 10 by the rising wire 5. When a distance is restored between the two wires 4, 5, an arc 7 is formed between the additional wire 5 and the supply conductor wire 4 or between the additional wire 5 and the tubular rivet 10 or the contact plate 2. During this discharge, the additional wire 5 acts as anode and the supply conductor wire 4 or the tubular rivet 10 or the contact plate 2 acts as cathode. In the arc, the end of the additional wire 5 is heated to above its melting temperature. The molten material closes off the aperture in the tubular rivet 10 and therefore also the aperture 2*a* in the contact plate 2 completely and, after solidifying, forms a permanent mechanical and electrical connection between the contact plate 2, the tubular rivet 10 and the supply conductor wire 4. The use of the tubular rivet 10 allows better contact with the supply conductor wire 4. The flange-over edge 11 of the tubular rivet 10 reduces the thermal load on the cap during the soldering process. This allows a correspondingly thinner contact plate 2 to be used. The aperture 2*a* in the contact plate 2 and the aperture in the insulating body 3, as well as the passage 10*a* in the tubular rivet 10, are preferably not rotationally symmetrical, in order to allow the contact plate 2 to be arranged in such a way that it cannot become twisted.

What is claimed is:

1. A method for connecting a supply conductor wire to a contact plate of an electric lamp, the supply conductor wire (4) being guided through an aperture (2*a*) in the contact plate (2) and being welded or soldered to the contact plate (2), characterized in that an additional wire (5) is used to connect the supply conductor wire (4) to the contact plate (2), an arc (7) being generated between the additional wire (5) and the supply conductor wire (4) or between the additional wire (5) and the contact plate (2), so that at least some of the material of the additional wire (5) is melted and the aperture (2*a*) is closed off with the aid of the molten material.

2. The method as claimed in claim 1, characterized in that, to generate the arc (7), the additional wire (5) is connected to the positive pole (8) of an electric voltage source and the contact plate (2) is connected to the negative pole (9) at the voltage source.

3. The method as claimed in claim 2, characterized in that there is electrical contact between the contact plate (2) and the supply conductor wire (4).

4. The method as claimed in claim 1, characterized in that the additional wire (5) consists of a material whose melting point is lower than the melting point of the contact plate (2).

5. The method as claimed in claim 1, characterized in that that end of the supply conductor wire (4) which is guided through the aperture (2*a*) is melted.

6. The method as claimed in claim 1, characterized in that the generation of the arc (7) and the melting of the additional wire (5) are carried out under an inert-gas atmosphere.

7. The method as claimed in claim 1, characterized in that the diameter of the aperture is less than the sum of the diameters of the supply conductor (4) and the additional wire (5).

8. The method as claimed in claim 1, characterized in that the supply conductor wire (4) consists of a material selected from the group consisting of copper, nickel, copper alloy or nickel alloy.

9. The method as claimed in claim 1, characterized in that the additional wire (5) consists of copper or a copper alloy.

10. The method as claimed in claim 1, characterized in that the contact plate (2) consists of a material selected from the group consisting of stainless steel, brass, copper or nickel.

11. The method as claimed in claim 1, characterized in that a metallic tubular rivet (10), which constricts the diameter of the aperture **(2*a*) and through which the supply conductor wire (4) is guided, is pulled into the aperture (2*a*) and into the aperture in the cap insulator (3)**.

12. The method as claimed in claim 11, characterized in that the tubular rivet (10) has a flange-over edge (11), which rests on the contact plate (2).

13. The method as claimed in claim 11, characterized in that the aperture in the cap insulator (3) has a non-rotationally symmetrical shape into which the tubular rivet (10) is fitted.

* * * * *